No. 642,585. Patented Feb. 6, 1900.
T. F. CROWLEY.
DEVICE FOR CUTTING ICE CREAM.
(Application filed Feb. 23, 1899.)
(No Model.)
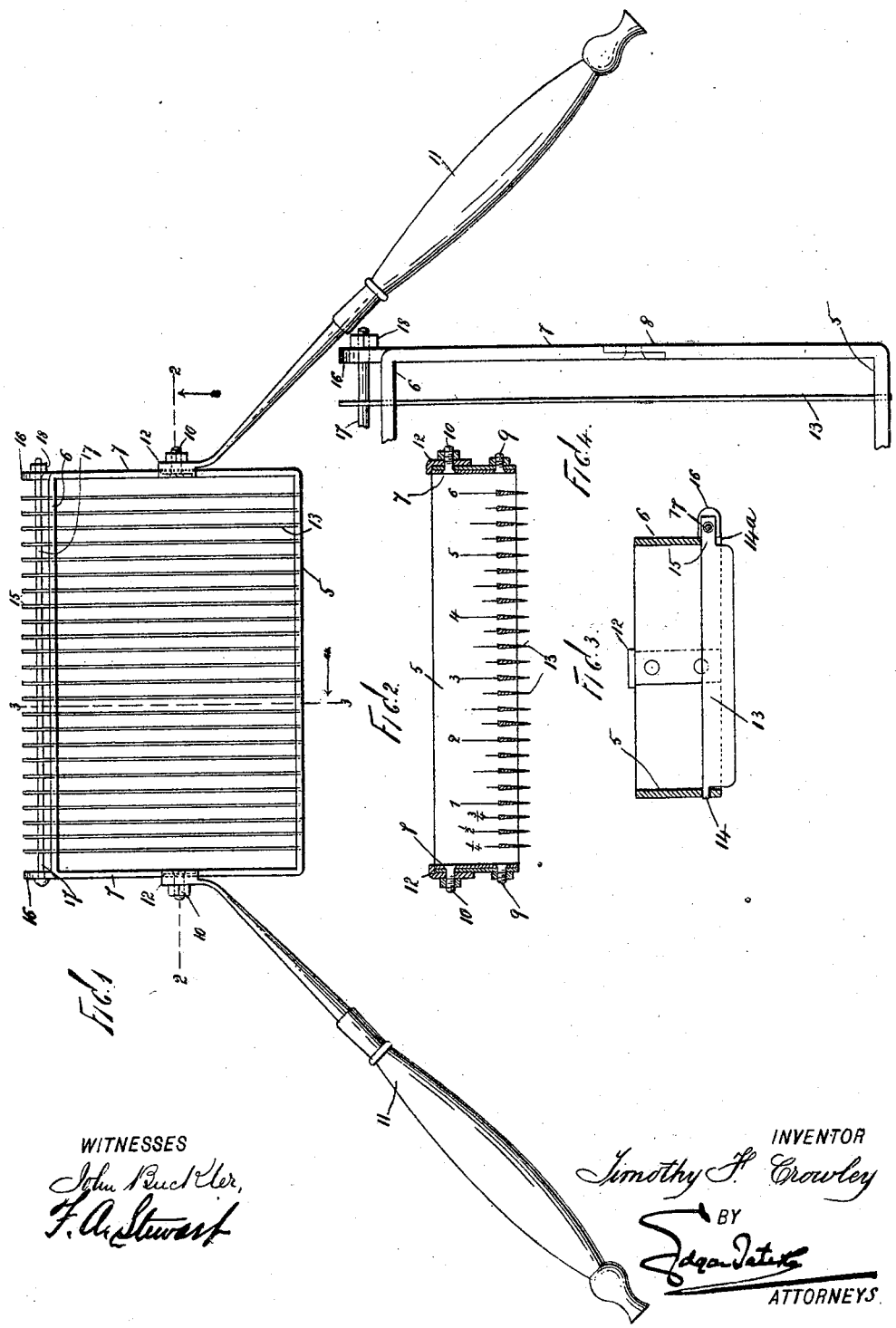

UNITED STATES PATENT OFFICE.

TIMOTHY FRANCIS CROWLEY, OF NEW YORK, N. Y.

DEVICE FOR CUTTING ICE-CREAM.

SPECIFICATION forming part of Letters Patent No. 642,585, dated February 6, 1900.

Application filed February 23, 1899. Serial No. 706,446. (No model.)

*To all whom it may concern:*

Be it known that I, TIMOTHY FRANCIS CROWLEY, a citizen of the United States, residing at New York, (Brooklyn,) in the county of Kings and State of New York, have invented certain new and useful Improvements in Devices for Cutting Ice-Cream and Similar Material, of which the following is a full and complete specification, such as will enable those skilled in the art to which it appertains to make and use the same.

This invention relates to devices for cutting bricks of ice-cream and similar material into thin cakes or blocks; and the object thereof is to provide an improved device of this class which is simple in construction and operation and by means of which the size of the cakes or blocks into which the brick is cut may be regulated as desired.

The invention is fully disclosed in the following specification, of which the accompanying drawings form a part, in which—

Figure 1 is a plan view of my improved cutting device; Fig. 2, a vertical longitudinal section on the line 2 2 of Fig. 1; Fig. 3, a vertical transverse section on the line 3 3 of Fig. 1; and Fig. 4, a plan view of one end of the cutter with the handle detached, said view being on an enlarged scale.

In the drawings forming part of this specification the separate parts of my improvement are designated by the same numerals of reference in each of the views, and in the practice of my invention I provide a device for the purpose specified which comprises an oblong rectangular frame composed of parallel side bars 5 and 6 and parallel end bars 7. This frame preferably consists of two parts, the end bars 7 being divided centrally and the separate parts being so formed as to overlap at the middle, as shown at 8 in Fig. 4, and said separate parts of the end bars 7 are connected by screws or bolts 9 and 10, passed therethrough at each end, as shown in Fig. 2. The ends of the frame are also provided with laterally-flaring handles 11, the shanks of which are provided with flat heads 12, secured to the end bars of the frame by the upper screws 10.

The frame is provided in the bottom thereof with a plurality of blades 13, and as shown in the drawings these blades are twenty-four in number and are one-quarter of an inch apart, and said plates are each provided at one end with a pintle 14, passed through a corresponding opening in the side 5 of the frame, and the opposite side 6 of the frame is provided with a plurality of vertical slots 14ª in the bottom thereof, which open downwardly and which equal in number the blades 13, and the blades 13 are provided on said side with a flat extension 15, and these extensions pass through the slots 14ª.

The end bars 7 at the side 6 of the frame are each provided with a shoulder or projection 16, and passing through said shoulders or projections is a rod 17, and said rod also passes through the end extension 15 of each of the blades 13, and the blades are held in position by said rod.

Although I have shown my improved cutter provided with twenty-four blades, it will be apparent that any desired number of said blades may be employed, and the size of the blocks or cakes into which the brick of ice-cream or other material is cut may be regulated by the number of said blades employed, and this number may be regulated at any time by taking out the rod 17, which is held in place by a nut 18 at one end thereof.

It is a well-known fact that bricks of ice-cream and similar material are usually cut into cakes or blocks by means of an ordinary table-knife, and this knife has to be heated in order that it may be easily forced through the brick of ice-cream or similar material, and this causes a waste of the material and also a great loss of time, and it is very difficult to cut the cakes or blocks of equal size. All these difficulties are obviated by my improvement, and by means thereof an entire brick of ice-cream or similar material may be cut into the required cakes or blocks at a single operation.

The frame of my cutter may be made of any desired material, as may also the blades 13, and said blades are preferably made narrow, so that they will not adhere unnecessarily to the material which is being cut.

My improvement is simple in construction and operation and well adapted to accomplish the result for which it is intended, and it will be apparent that changes in and modifications of the construction described may be made without departing from the spirit of my invention or sacrificing its advantages.

One end of the frame in which the blades are mounted is also provided with a scale, as shown in Fig. 2, and the lines of this scale are in the same vertical planes with the blades or the devices by which said blades are held in place, and by means of this scale the exact thickness of the blocks or cakes into which a brick is cut may be determined.

Having fully described my invention, I claim as new and desire to secure by Letters Patent—

1. A device of the class described, comprising an oblong rectangular frame composed of parallel sides and parallel ends, and a plurality of blades arranged in said frame, said blades being provided at one end with a pintle, and at the opposite end with a flat extension, and the sides of the frame being provided one with holes adapted to receive said pintle, and the other with slots adapted to receive said extensions, the ends of the frame being also provided with shoulders or projections at one side, and a rod which is passed therethrough and through said extensions of said blades, substantially as shown and described.

2. A device of the class described, comprising an oblong frame, provided at its ends with handles, one side of said frame being provided with holes, and the other side with slots, and transverse blades, one end of each of which is inserted in one of said holes, and the other end of each of which fits in one of said slots, and adjustable devices connected with said frame for locking said blades in position, substantially as shown and described.

In testimony that I claim the foregoing as my invention I have signed my name, in presence of the subscribing witnesses, this 21st day of February, 1899.

TIMOTHY FRANCIS CROWLEY.

Witnesses:
JAMES FORSYTH RINGLAND,
CHARLES ELTING RICKERSON.